United States Patent
Hicks

(10) Patent No.: US 6,493,552 B1
(45) Date of Patent: Dec. 10, 2002

(54) METHOD FOR RECOVERING SERVICE AFTER REGISTRATION FAILURE IN A CELLULAR SYSTEM

(75) Inventor: Scott Hicks, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 617 days.

(21) Appl. No.: 08/984,898

(22) Filed: Dec. 4, 1997

(51) Int. Cl.[7] .................................................. H04Q 7/20
(52) U.S. Cl. ........................................ 455/435; 455/434
(58) Field of Search ................................. 455/435, 433, 455/434, 456, 426, 552

(56) References Cited

U.S. PATENT DOCUMENTS

| | | | | |
|---|---|---|---|---|
| 4,903,320 A | * | 2/1990 | Hanawa ...................... | 455/434 |
| 4,972,355 A | * | 11/1990 | Mullins ...................... | 455/435 |
| 5,369,798 A | * | 11/1994 | Lee ............................. | 455/343 |
| 5,504,803 A | * | 4/1996 | Yamada et al. ............. | 455/426 |
| 5,574,973 A | * | 11/1996 | Borth et al. ................ | 455/435 |
| 5,794,148 A | * | 8/1998 | Mamaghani et al. ....... | 455/435 |
| 5,819,174 A | * | 10/1998 | Kyllonen .................... | 455/435 |
| 5,862,482 A | * | 1/1999 | Beesley ...................... | 455/434 |
| 5,946,620 A | * | 8/1999 | Schultz et al. .............. | 455/435 |
| 5,953,665 A | * | 9/1999 | Mattila ........................ | 455/434 |

FOREIGN PATENT DOCUMENTS

| | | |
|---|---|---|
| EP | 0 260 763 A2 | 3/1988 |
| EP | 0 652 680 A2 | 5/1995 |

OTHER PUBLICATIONS

"Intelligent Roaming," TR45.3.6/97.04.28.13, Source: AT&T Wireless Services, Inc., 57 pages.

* cited by examiner

*Primary Examiner*—Lester G. Kincaid
*Assistant Examiner*—Erika A. Gary
(74) *Attorney, Agent, or Firm*—Coats & Bennett, P.L.L.C.

(57) ABSTRACT

A mobile station in a wireless communication network registers periodically with the network by sending a registration message to the network on a control channel. After a predetermined consecutive number of registration attempts are made by the mobile station without a registration response from the base station, the mobile station leaves the current control channel and searches for a new control channel on which to acquire service. After acquiring service on the new control channel, the mobile station can register with the network to recover service.

11 Claims, 3 Drawing Sheets

METHOD FOR RECOVERING SERVICE AFTER REGISTRATION FAILURE IN A CELLULAR SYSTEM

FIELD OF THE INVENTION

The present invention relates generally to the field of digital radio communication systems and, more particularly, to the periodic registration procedure in a digital radio communication system used to identify and update the location and activity status of mobile radio communication devices within said system.

BACKGROUND OF THE INVENTION

In a cellular communication network, the geographic area covered by the network is divided into a plurality of cells. Each cell has a base station for communication with the mobile stations within that cell. The base station serves as an interface between the mobile stations in the cell and the network. To maintain communications with the mobile station, the network needs to track the location of the mobile station as it travels from one cell in the network to another cell. Tracking the location of the mobile station is accomplished by requiring the mobile station to periodically register with the network. During the registration procedure, the mobile station sends a registration message to the network. The network notes the location of the mobile station that is recorded in the network's home location register (HLR) or visitor location register (VLR).

The HLR includes a database for storing subscriber information such as the subscriber's international mobile subscriber identification (IMSI), the subscriber's phone number from the public network, the subscriber's permitted supplementary services, and information related to the subscriber's current location. The HLR provides the MSC with the necessary subscriber data when a call originates from the public network. Much of the same information is also stored in the VLR. The VLR, however, stores more detailed information about the current location of the mobile station than the HLR. The VLR provides the MSC with the necessary subscriber data when a call originates from the mobile station.

When a mobile station is active (i.e., powered on), it periodically sends a registration message to the network which notes the location of the mobile station and updates the information in the HLR and VLR concerning the mobile station's location and activity status. When the network fails to receive a registration message from the mobile station after a long period of time, the network may assume that the mobile station is out of service, either because the mobile station is turned off or because it is no longer present in the network. In such cases, the network may update the HLR and VLR to indicate that the mobile station is inactive. Thereafter, if a call is addressed to the inactive mobile station, the network, instead of paging the mobile station, will simply send a message to the caller advising the caller that the mobile station is out of service.

IS-136 is a communication protocol for a TDMA wireless communication system that employs a digital control channel (DCCH). IS-136 is published by the Telecommunications Industry Association. Mobile phones implementing this protocol are required to register periodically on a DCCH. After sending a registration message to the base station, the mobile station enters a registration proceeding state and waits for a response from the base station. If the base station does not respond within a predetermined period of time, the mobile station resends the registration message up to a maximum of five times. After six registration failures, the mobile station will return to camping on the last used DCCH.

One shortcoming with the registration method described in IS-136 is that the mobile station remains camped on an obviously dysfunctional control channel. Since the base station does not respond to the registration messages from the mobile station, it is also unlikely to respond to any attempts by the mobile station to originate a call. Moreover, if the mobile station has failed at six consecutive registration attempts, the network may modify its HLR and VLR to indicate that the mobile station is inactive. Any person attempting to call the mobile station would likely receive a message indicating that it is no longer in service. Also, messages such as short text messages, message waiting indications, etc., would not be forwarded to the mobile station.

SUMMARY OF THE INVENTION

The present invention relates to registration procedures used by a mobile station which is locked onto a D-AMPS digital control channel (DCCH). In particular, the present invention relates to a method for re-establishing service on a digital control channel after a predetermined number of registration attempts have failed.

The term registration refers to the steps taken by a mobile station to identify itself to a base station as being active in the system. To register with the network, the mobile station sends a registration message to the base station and then enters the registration proceeding state. Upon entering the registration proceeding state, the mobile station starts a registration timer. If a response is received from the base station prior to the expiration of the timer, the mobile station takes action according to the response and it returns to camping on the current DCCH. On the other hand, if the registration timer expires without a response from the base station, the mobile station sets a re-registration timer and returns to camping on the DCCH. When the re-registration timer expires, the mobile station re-attempts registration on the current DCCH. After six consecutive attempts at registration have been made without a response from the base station, the mobile station assumes that the current DCCH is dysfunctional and searches for a new control channel on which to acquire service. If a suitable control channel is found, the mobile station will attempt to register on the new control channel. Thus, the mobile phone is prevented from camping on a dysfunctional control channel.

The present invention can also be applied to any DCCH scanning and locking algorithm. After a predetermined number of attempts to register have been made without a response from the base station, the mobile station would leave the current DCCH and continue the scan for another control channel.

DETAILED DESCRIPTION OF THE INVENTION

Figure 1:
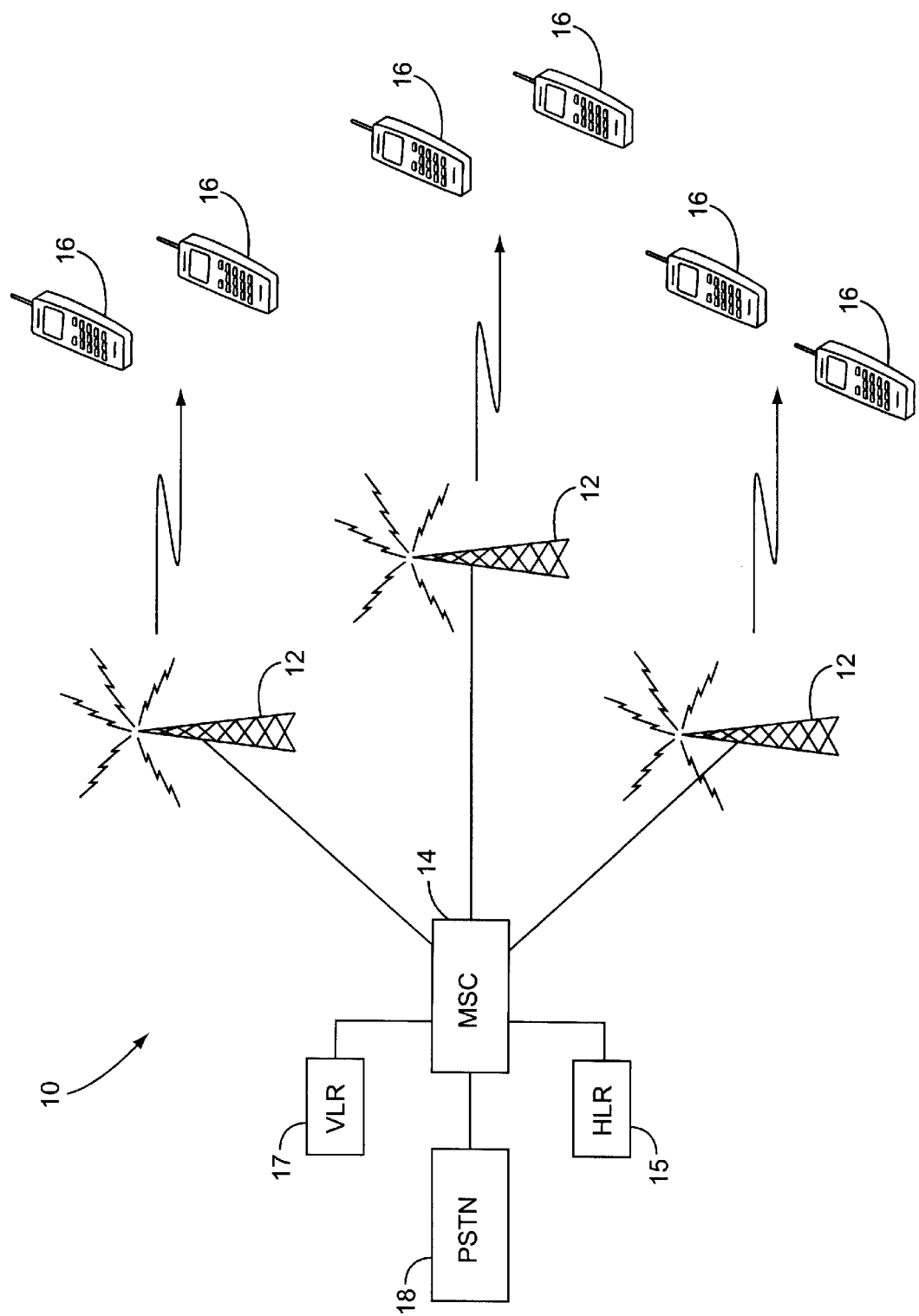
FIG. 1 is a schematic diagram illustrating the architecture of a typical cellular communication system.

Referring now to the drawings, the registration method of the present invention will be described. The registration method of the present invention is used in a mobile cellular system as shown in FIG. 1. The mobile cellular system, which is indicated generally by the numeral 10, comprises a plurality of base stations 12 which are connected via a mobile services switching center (MSC) 14 to a terrestrial communications network such as the Public Switched Telephone Network (PSTN) 18. Each base station 12 is located in and provides service to a geographic region referred to as a cell. In general, there is one base station 12 for each cell within a given system. Within each cell, there may be a plurality of mobile stations 16 that communicate via radio link with the base station 12. The base station 12 allows the user of the mobile station 16 to communicate with other mobile stations 16, or with users connected to the PSTN 18. The mobile services switching center 14 routes calls to and from the mobile station 16 through the appropriate base station 12. Information concerning the location and activity status of the mobile station 16 is stored in a Home Location Register (HLR) 15 and a Visitor Location Register (VLR) 17 which are connected to the MSC 14.

Figure 2:
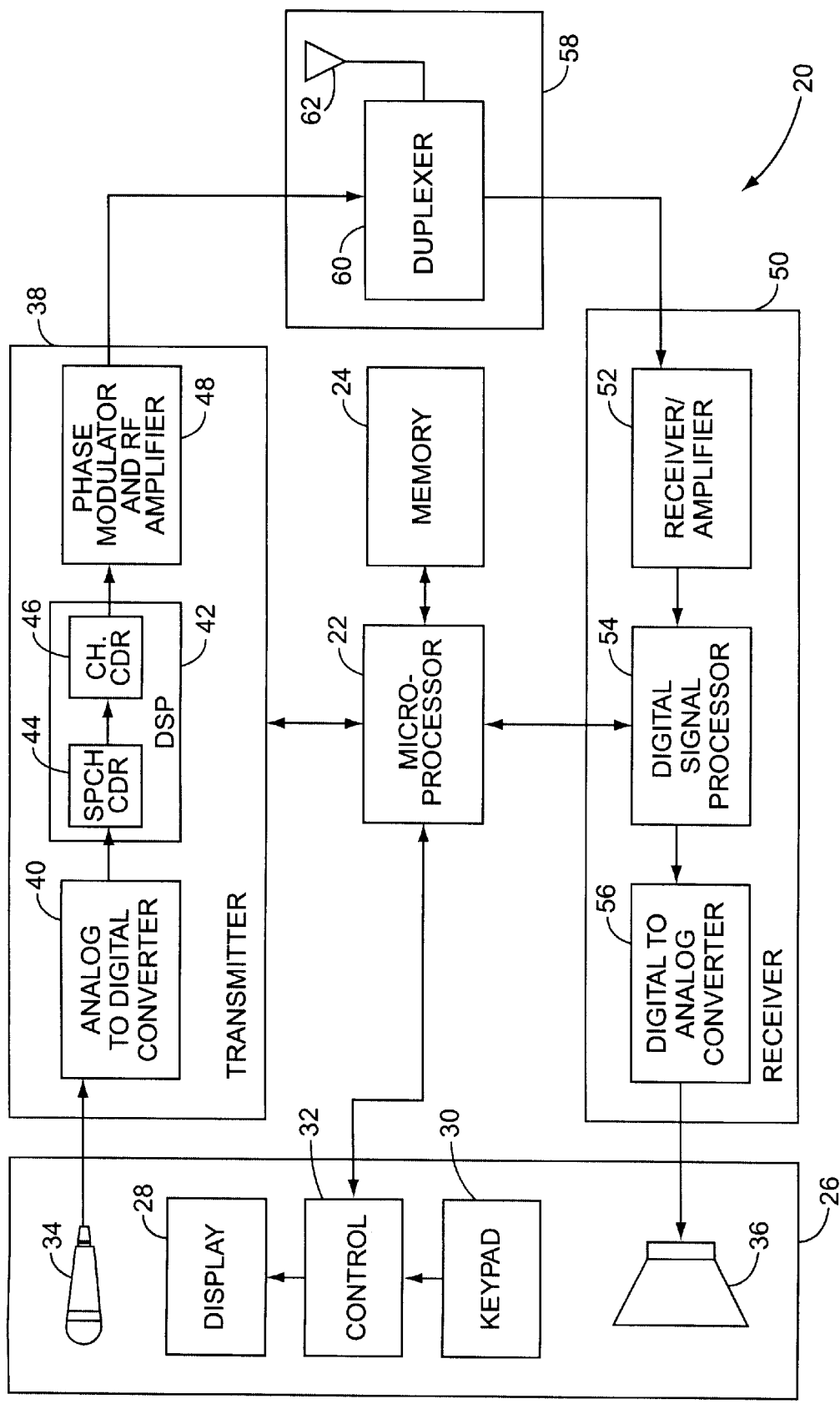
FIG. 2 is a schematic diagram illustrating the architecture of a typical mobile station in a cellular communication system.

FIG. 2 is a block diagram of a typical mobile station 16 that uses the registration method of the present invention. The mobile station 16 shown in FIG. 2 is a fully functional radio transceiver 20 capable of transmitting and receiving digital signals. The transceiver 20 includes an microprocessor 22, an operator interface 26, a transmitter 38, the receiver 50, and an antenna assembly 58.

The operator interface 26 includes a display 28, keypad 30, control unit 32, microphone 34, and speaker 36. The display 28 allows the operator to see dialed digits and call status information. The keypad 30 allows the operator to dial numbers, enter commands, and select options. The control unit 32 interfaces the display 28 and keypad 30 with the microprocessor 22. The microphone 34 receives audio signals from the user and converts the audio signals to analog signals. Speaker 36 converts analog signals from the receiver 50 to audio signals which can be heard by the user.

The analog signals from the microphone 34 are applied to the transmitter 38. The transmitter 38 includes an analog to digital converter 40, a digital signal processor 42, and a phase modulator and RF amplifier 48. The analog to digital converter 40 changes the analog signals from the microphone 34 into a digital signal. The digital signal is passed to the digital signal processor (DSP) 42 which contains a speech coder 44 and channel coder 46. The speech coder 44 compresses the digital signal and the channel coder 46 inserts error detection, error correction and signaling information. The compressed and encoded signal from the digital signal processor 42 is passed to the phase modulator and RF amplifier 48 which are shown as a single block in FIG. 2. The modulator converts the signal to a form which is suitable for transmission on an RF carrier. The RF amplifier then boosts the output of the modulator for transmission via the antenna assembly 58.

The receiver 50 includes a detector/amplifier 52, digital signal processor 54, and a digital to analog converter 56. Digital signals received by the antenna assembly 58 are passed to the receiver/amplifier 52 which boosts the low level RF digital signal to a level appropriate for input to the digital signal processor 54. The digital signal processor 54 includes an equalizer to compensate for phase and amplitude distortions in the channel corrupted signal, and a demodulator for extracting the transmitted bit sequence from the received signal. A channel decoder detects and corrects channel errors in the received signal. The channel decoder also separates control and signaling data from speech data. The control and signaling data is passed to the microprocessor 22. Speech data is processed by a speech decoder and passed to the digital to analog converter 56. The digital to analog converter 56 converts the speech data into an analog signal which is applied to the speaker 36 to generate audible signals which can be heard by the user.

The antenna assembly 58 is connected to the RF amplifier of the transmitter 38 and to the receiver/amplifier 52 of the receiver 50. The antenna assembly 58 includes a duplexer 60 and an antenna 62. The duplexer 60 permits full duplex communications over the antenna 62.

The microprocessor 22 functions coordinates the operation of the transmitter 38 and the receiver 50. These functions include power control, channel selection, timing, as well as a host of other functions. The microprocessor 22 inserts signaling messages into the transmitted signals and extracts signaling messages from the received signals. The microprocessor 22 responds to any base station commands contained in the signaling messages, and implements those commands. When the user enters commands via the keypad 30, the commands are transferred to the microprocessor 22 for action.

The mobile station 16 communicates with the base station 12 on a communications channel. A communications channel is typically a pair of frequencies, one that transmits and one that receives, used by a mobile station 16 to communicate within a wireless communication system. Some communication channels are for control functions (i.e., control channels) while others are for voice and data communications (i.e., traffic channels). Control channels are generally used to transmit control and signaling messages to and from the mobile station 16 that are necessary to maintain service on the communication channel. Traffic channels are used primarily to transmit voice and data signals, however, some control messages are also transmitted on the traffic channels.

In operation, the mobile station 16 selects a control channel during power-up on which to acquire service. When a suitable control channel is found, the mobile station 16 enters a control channel camping state. The camping state refers to a state of readiness attained after acquiring service on a control channel. The mobile station 16 will leave the camping state only to process certain transactions such as an originated call, a terminated call, or a registration. A full description of the DCCH camping state is provided in IS-136.1, Section 6.2.3.

While in the camping state, the mobile station 16 may receive and place calls to other mobile stations 16 or to phones in the PSTN 18. To maintain service, the mobile station 16 must periodically register with the network. The mobile station 16 includes a built-in timing mechanism to determine when registration is required. The periodic registration provides the network with an update of the location and activity status of the mobile station 16.

IS-136.1 published by the Telecommunications Industry describes the registration procedures used by mobile stations 16 camped on a DCCH and is incorporated herein by reference. To briefly summarize, the base station 12 transmits certain registration parameters to the mobile station 16 using the fast broadcast control channel (FBCCH). The registration parameters include the parameters REGID and REGID PER. REGID is an updateable system clock internal to the mobile station 16 ranging from 0 to 1,048,575 increments. REGID PER indicates how often REGID system clock is incremented and is expressed in superframes. The mobile station 16 includes a permanent variable called NXTREG that indicates when the mobile station 16 must register. The mobile station 16 increments the REGID system clock every n'th superframe as determined by the REGID PER parameter. When REGID equals or exceeds the value stored in the NXTREG variable, a periodic registration is transmitted to the base station 12.

One shortcoming of the IS-136.1 protocol is that it does not make provision for recovery of service when the DCCH is dysfunctional for some reason. For example, conditions may prevent the base station 12 from detecting signals from the mobile station 16 even though the mobile station 16 can detect the DCCH. Under these conditions, the mobile station 16 camped on the DCCH will repeatedly transmit a registration to the base station 12 at periodic time intervals. After six consecutive failed registration attempts are made, the mobile station 16 will simply return to camping on the DCCH without taking any further action. When the mobile station 16 fails to register after an extended period of time, the network may update its HLR 15 and VLR 17 to indicate that the mobile station 16 is inactive. Thereafter, if a call is placed to the mobile station 16, the network will send a message to the caller advising that the mobile station 16 is out of service without forwarding the call to the mobile station 16.

Figure 3:
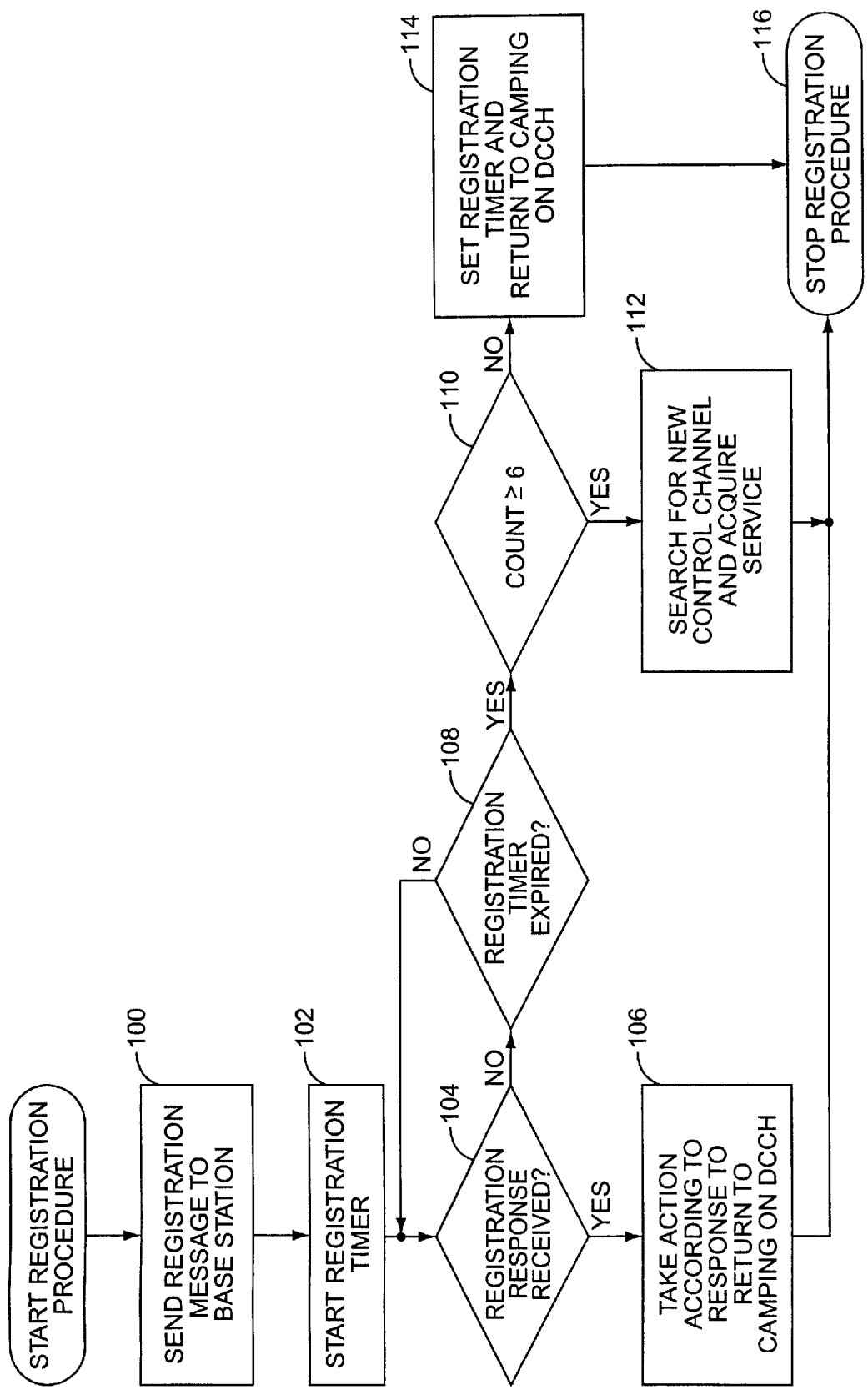
FIG. 3 is a flow diagram illustrating the service recovery method of the present invention.

According to the present invention, the mobile station 16 leaves the current DCCH after a prescribed number of registration attempts with no registration response from the base station and tries to find a different control channel upon which to acquire service and register. FIG. 3 is a flow chart illustrating the registration method of the present invention. When the registration procedure is invoked, the mobile station 16 sends a registration message to the base station 12 (block 100) and starts a registration timer (block 102). Conditions which invoke the registration procedure are described in IS136.1-A Section 6.2.3. The mobile station 16 then waits for a registration response from the base station 12 (block 104). If a registration response is received by the mobile station 16 from the base station 12, the mobile station 16 takes action according to the response and returns to camping on the current DCCH (block 106). If the registration timer expires (block 108) without a registration response from the base station 12, the mobile station 16 increments a counter which indicates the consecutive number of times the mobile station 16 has transmitted a registration message without a registration response from the base station 12. This number is compared to a predetermined maximum number of registration attempts (block 110). If the number of consecutive registration attempts without a base station response is less than the predetermined maximum number (block 110) the mobile station sets a re-registration timer (block 114) and returns to camping on the DCCH. For example, if the predetermined maximum number of registration attempts is equal to six, the mobile station 16 will set the re-registration timer after the first five registration attempts without a registration response from the base station 12. After the sixth attempt, the mobile station 16 leaves the current DCCH and invokes a channel searching procedure in an attempt to find a new DCCH (block 112). The mobile station 16 may use the scanning procedures defined in IS 136.1. Alternatively, the mobile station 16 may use the Intelligent Roaming scanning procedures described in TR45.3.6/97.06.11.18. Upon finding a suitable control channel, the mobile station 16 may acquire service and register on the new control channel.

Upon acquiring service on the new control channel, the mobile station 16 will be required to register with the network. If necessary, the network will then update the HLR 15 to indicate the location and current activity status of the mobile station 16. If the mobile station 16 had previously been designated as inactive by the network, service to the mobile station 16 will be restored.

The present invention is not limited to periodic registrations, but could be also applied to any DCCH scanning and locking algorithm. After finding a suitable candidate channel, the mobile station 16 could send a registration message to the base station 12. The registration message would be repeated if no response is received from the base station 12. After a predetermined number of attempts are made without a response from the base station 12, the mobile station 16 would leave the current DCCH and continue scanning.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A registration method implemented by a mobile communication device in wireless communications network comprising:
   a) acquiring service on a first control channel;
   b) periodically sending a registration message on said first control channel from said mobile communication device to a base station; and
   c) leaving said first control channel and searching for a second control channel in response to a predetermined number of consecutive registration messages being sent by said mobile communication device without a registration response from said base station.

2. The registration method according to claim 1 further including the step of acquiring service on said second control channel.

3. The registration method according to claim 2 further including the step of sending a registration message on said second control channel from said mobile communication device to said base station after acquiring service on said second control channel.

4. A registration method implemented by a mobile communication device in wireless communications, comprising:
   a) sending a registration message from said mobile communication device to a base station on a first control channel;
   b) setting a first timer by said mobile communication device after sending each registration message and waiting for a registration response from said base station;
   c) upon expiration of said first timer without a registration response from said base station, setting a second timer;
   d) resending said registration message on said first control channel upon expiration of said second timer;
   e) repeating steps c) and d) until a predetermined consecutive number of registration messages have been sent or until a registration response is received from said base station;
   f) leaving said first control channel and searching for a second control channel after said predetermined consecutive number of registration messages have been sent by said mobile communication device without a registration response from said base station.

5. The registration method according to claim 4 further including the step of acquiring service on said second control channel.

6. The registration method according to claim 5 further including the step of sending a registration message on said second control channel from said mobile communication device to said base station after acquiring service on said second control channel.

7. The registration method according to claim 4 wherein the period of the second timer is a randomly selected period within a designated range measured in superframes.

8. The registration method according to claim 7 wherein the period of the second timer is in the range of 16 to 40 superframes.

9. A registration method implemented by a mobile communication device in wireless communications network comprising:

a) sending a registration message on a first control channel from said mobile communication device to a base station;

b) if no response is received to said registration message, repeating said registration message a predetermined number of times until a response is received from said base station; and c) leaving said first control channel and searching for a second control channel in response to a predetermined number of registration messages being sent by said mobile communication device without a registration response from said base station.

10. The registration method according to claim 9 further including the step of acquiring service on said second control channel.

11. The registration method according to claim 10 further including the step of sending a registration message on said second control channel from said mobile communication device to said base station after acquiring service on said second control channel.

* * * * *